US012811830B2

(12) United States Patent
Kim et al.

(10) Patent No.: US 12,811,830 B2
(45) Date of Patent: Nov. 24, 2026

(54) RECEIVER COEFFICIENT GUIDED ADAPTATION OF PRE-EQUALIZER COEFFICIENTS

(71) Applicant: Credo Technology Group Limited, George Town (KY)

(72) Inventors: Kyungjin Kim, San Jose, CA (US); Yuan-Chih Chang, Hsinchu County (TW); Yi-Chin Tsai, Hsinchu County (TW); Tung-Lin Lee, Hsinchu County (TW)

(73) Assignee: Credo Technology Group Limited, Grand Cayman (KY)

( * ) Notice: Subject to any disclaimer, the term of this patent is extended or adjusted under 35 U.S.C. 154(b) by 105 days.

(21) Appl. No.: 18/953,490

(22) Filed: Nov. 20, 2024

(65) Prior Publication Data

US 2026/0142855 A1 May 21, 2026

(51) Int. Cl.
*H04L 25/03* (2006.01)

(52) U.S. Cl.
CPC .............................. *H04L 25/03057* (2013.01)

(58) Field of Classification Search
CPC ................................................ H04L 25/03057
See application file for complete search history.

(56) References Cited

U.S. PATENT DOCUMENTS 4,621,366 A * 11/1986 Cain ................. H04L 25/03038 375/222
2015/0288544 A1* 10/2015 Al-Banna ......... H04L 25/03057 375/231
2020/0076651 A1* 3/2020 Sun ................... H04L 25/03885
2024/0235906 A1* 7/2024 Lillie ................ H04L 25/03012

* cited by examiner

*Primary Examiner* — David B Lugo
(74) *Attorney, Agent, or Firm* — Daniel J. Krueger; Ramey LLP

(57) ABSTRACT

Disclosed equalizers, transceivers, communication systems, and associated methods, provide adaptation of pre-equalizer coefficients based on at least one receive filter coefficient. One illustrative equalizer includes: a discrete-time, finite impulse response ("FIR") filter configured to convert a receive signal to a filtered signal; a decision element to determine channel symbols represented by the filtered signal; and a controller. The controller is: configured to adjust coefficients for the FIR filter based on a performance of the equalizer, the coefficients including a first post-cursor coefficient; and configured to change a first post-cursor coefficient of a pre-equalizer if the first post-cursor coefficient of the FIR filter has a magnitude exceeding a first threshold.

15 Claims, 3 Drawing Sheets

RECEIVER COEFFICIENT GUIDED ADAPTATION OF PRE-EQUALIZER COEFFICIENTS

TECHNICAL FIELD

The present disclosure relates generally to communication transceiver training and more specifically to communication transceivers and methods that prioritize the adaptation order of pre-equalizer coefficients based on coefficient values of a trained receive filter.

BACKGROUND

The Peripheral Component Interconnect Express ("PCIe") Specification is one of a variety of standards for general purpose input/output interconnects. Such interconnects are frequently used for expansion buses that can accept expansion cards or other interchangeable components for augmenting the resources and capabilities of computers and other electronic systems. The PCI Special Interest Group is an industry consortium that regularly updates the PCIe Specification every few years to double the data rate while maintaining backward compatibility. The supported data rates make PCIe attractive for systems designed to implement machine learning, artificial intelligence, real time image processing, gaming, high bandwidth data storage, and even computer center networking.

With its origins as a parallel bus, PCIe imposes strict limitations on latency to facilitate the use of a load-store interconnect protocol. This latency limitation necessarily limits the reach of a given PCIe link particularly at high symbol rates where noise or other signal integrity issues may necessitate relatively frequent retransmissions. Equalizers and retimers may combat such signal integrity issues and (despite increasing the minimum latency) may improve consistency and substantially reduce the average transaction latency.

The most recent versions of the specification raise the data rate in part by altering the signaling scheme to employ 4-level pulse amplitude modulation (PAM4) channel symbols rather than non-return to zero (NRZ) channel symbols. This change reduces the signal margin, often necessitating the use of an equalizer and/or retimer to assure that the bit error rate is maintained at a sufficiently low level.

As with most integrated circuit devices, receivers and retimers have become so complex that it is impractical for electronic device designers to design them from scratch. Instead, electronic device designers rely on predefined modular units of integrated circuit layout designs, arranging and joining them as needed to implement the various functions of the desired device. Each modular unit has a defined interface and behavior that has been verified by its creator. Though each modular unit may take significant effort and investment to create, its availability for re-use and further development cuts product cycle times dramatically and enables better products. The predefined units can be organized hierarchically, with a given unit incorporating one or more lower-level units and in turn being incorporated within higher-level units. Many organizations have libraries of such predefined modular units for sale or license, including, e.g., embedded processors, memory, interfaces for different bus standards, power converters, frequency multipliers, sensor transducer interfaces, to name just a few. The predefined modular units are also known as cells, blocks, cores, and macros—terms which have different connotations and variations ("IP core", "soft macro") but are frequently employed interchangeably.

The modular units can be expressed in different ways, e.g., in the form of a hardware description language (HDL) file, or as a fully routed design that could be directly rendered as a series of manufacturing process masks. Fully routed design files are typically process-specific, meaning that additional design effort would usually be needed to migrate the modular unit to a different process or manufacturer. Modular units in HDL form require subsequent synthesis, placement, and routing steps for implementation, but are process-independent, meaning that different manufacturers can apply their preferred automated synthesis, placement, and routing processes to implement the units using a wide range of manufacturing processes. By virtue of their higher-level representation, HDL units may be more amenable to modification and the use of variable design parameters, whereas fully routed units may offer better predictability in terms of areal requirements, reliability, and performance. While there is no fixed rule, digital module designs are more commonly specified in HDL form, while analog and mixed-signal units are more commonly specified as a lower-level, physical description.

Serializer-deserializer (SerDes) cores are a frequent need for device designs that employ modern data communications standards, which continue to evolve towards higher symbol rates and larger numbers of bits per channel symbol. At higher symbol rates, channel symbols become more attenuated and dispersed as they propagate, causing ever more severe intersymbol interference (ISI) at the receiving end of the channel. When trying to detect the channel symbols, receivers must contend with this ISI in addition to the channel noise that contaminates the receive signal. Recent versions of the PCIe standard provide for the use of pre-equalization by the transmitters to reduce ISI. Between the receiver and transmitter, there may be more than 20 filter coefficients and other equalization parameters that need to be optimized at power on or reset not only to account for changes to the channel response, but also with potential changes in performance of the equalizer components due to process variation, supply voltage variation, and temperature variation (collectively, "PVT variations") and drift due to component aging.

A popular technique for coping with such changes is known as adaptive equalization, a technique in which an equalizer's parameters are iteratively adjusted until the equalizer's performance converges to an optimum value. A known challenge with adaptive equalization is the training time that may be required for such convergence to occur, particularly when many parameters are being adapted. Under the right circumstances, convergence can be accelerated by focusing on a few parameters at a time.

SUMMARY

Accordingly, there are disclosed herein equalizers, transceivers, communication systems, and associated methods, that provide adaptation of pre-equalizer coefficients based on at least one receive filter coefficient. One illustrative equalizer includes: a discrete-time, finite impulse response ("FIR") filter configured to convert a receive signal to a filtered signal; a decision element to determine channel symbols represented by the filtered signal; and a controller. The controller is: configured to adjust coefficients for the FIR filter based on a performance of the equalizer, the coefficients including a first post-cursor coefficient; and configured to change a first post-cursor coefficient of a pre-equalizer if the first post-cursor coefficient of the FIR filter has a magnitude exceeding a first threshold.

An illustrative equalization method includes: converting a receive signal to a filtered signal using a discrete-time, finite impulse response ("FIR") filter; using a decision element to determine channel symbols represented by the filtered signal; adjusting coefficients for the FIR filter based on a performance of the equalizer, the coefficients including a first post-cursor coefficient; and changing a first post-cursor coefficient of a pre-equalizer if the first post-cursor coefficient of the FIR filter has a magnitude exceeding a first threshold.

The foregoing method and equalizer can be embodied as a semiconductor IP core stored on a non-transitory information storage medium. When used by a suitably configured computer, the semiconductor IP core provides the circuit and/or process mask designs for manufacturing integrated circuit devices having the above-described components to implement the above-described method.

An illustrative communication system includes a remote port coupled to a local port. The remote port includes: a pre-equalizer configured to convert a digital transmit signal to an equalized transmit signal; and a digital to analog converter configured to convert the equalized transmit signal to a channel signal. The local port includes: an analog to digital converter configured to provide a digital receive signal representing the channel signal; a discrete-time, finite impulse response ("FIR") filter configured to convert the digital receive signal to a filtered signal; a decision element to determine channel symbols represented by the filtered signal; and a local controller configured to adjust at least one coefficient for the FIR filter based on equalization performance, the local controller further configured to change at least one corresponding coefficient of the pre-equalizer if the at least one coefficient of the FIR filter has a magnitude exceeding a first threshold.

Each of the foregoing may be implemented individually or conjointly and may be combined with any one or more of the following optional features: 1. the performance is based on the channel symbols and at least one of the filtered signal or an input signal to the decision element. 2. the controller changes the first post-cursor coefficient of the pre-equalizer in part by sending a change request via an embedded backchannel to a far end transmitter. 3. the change request is a request to increment a magnitude of the specified coefficient. 4. the coefficients include a first pre-cursor coefficient. 5. the controller is configured to change a first pre-cursor coefficient of the pre-equalizer if the first pre-cursor coefficient has a magnitude exceeding a second threshold. 6. the controller is further configured to iteratively adjust coefficients and change the first post-cursor coefficient or the first pre-cursor coefficient until the performance reaches a target. 7. the controller is further configured to store coefficients for the FIR filter and for the pre-equalizer for use as initial values after power on or reset. 8. the local controller changes the at least one corresponding coefficient of the pre-equalizer in part by sending a change request via an embedded backchannel to a controller of the remote port. 9. the at least one coefficient is a first pre-cursor coefficient for the FIR filter and the at least one corresponding coefficient is a first pre-cursor coefficient for the pre-equalizer. 10. the local controller is further configured to change a first post-cursor coefficient for the pre-equalizer if a first post-cursor coefficient for the FIR filter has a magnitude exceeding a second threshold.

DETAILED DESCRIPTION

Figure 1:
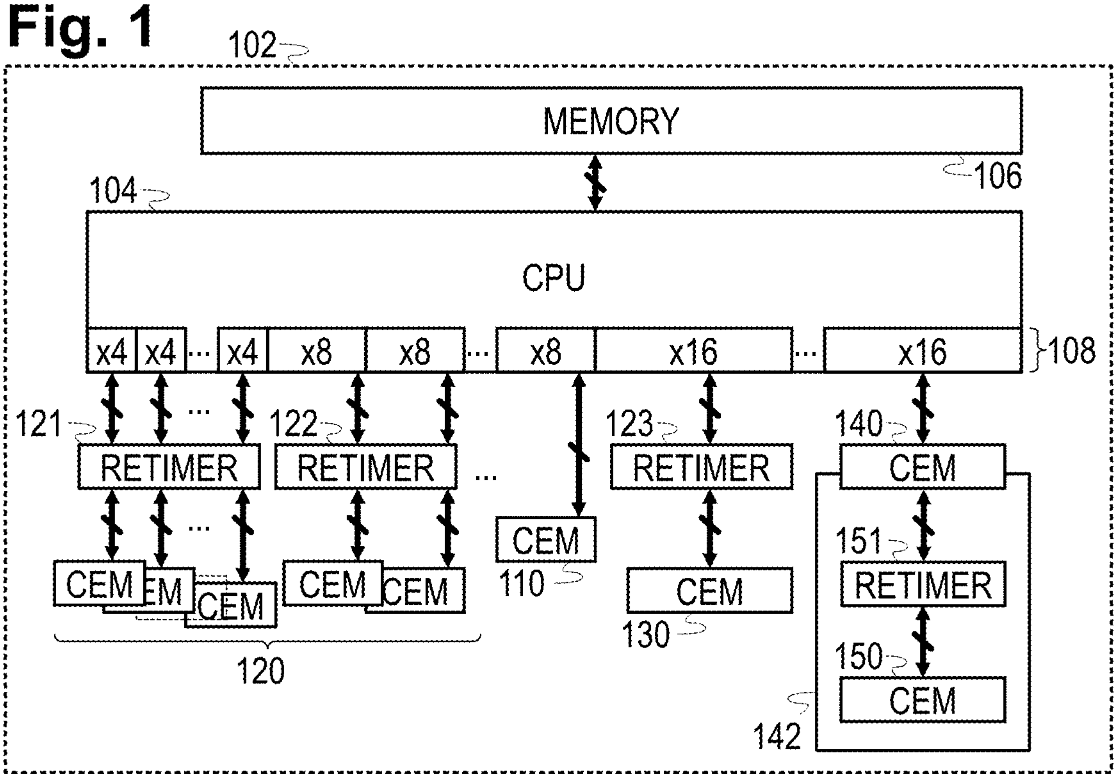
FIG. 1 is a block diagram of an illustrative computer system using PCIe bus interfaces to interconnect a processor module with multiple peripheral slots.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

The disclosed adaptive equalizers and training methods are best understood in an illustrative context. Accordingly, FIG. 1 shows an illustrative computer system 102 having a processing module 104 (labeled as CPU), which interfaces with a system memory 106 to retrieve instructions and data for implementing programmable functions. The processing module 104 is shown with multiple PCIe bus interfaces 108 to connect with various other components via, e.g., connectors having a standard Card Electromagnetic (CEM) slot form factor. Other PCIe connector form factors are known and may be used.

FIG. 1 shows CEM slots 110, 120, 140, 150 that may support different numbers of lanes and different PCIe data rates as needed for different types of components. Components such as graphical processing units and video display cards may employ connectors using the highest data rates and number of lanes, whereas bridges to peripheral components, printers, keyboards, pointing devices, and general input/output buses may emply connectors using slower data rates and fewer lanes. Intermediate connectors may be employed for hard drives, solid state drives, network interfaces, cameras, scanners. Some slots, e.g., CEM slot 110, are shown without retimers. Some retimers, e.g., retimers 121, 122, may support communications to multiple CEM slots 120 that require fewer than the number of lanes a given retimer can support. Retimer 123 provides retiming of communications between the processing module and CEM slot 130. CEM slot 140 has no retimer, but accepts a riser card 142. Riser card 142 has a retimer 151 that may provide retiming for communications with the riser card's CEM slot(s) 150.

Figure 2:
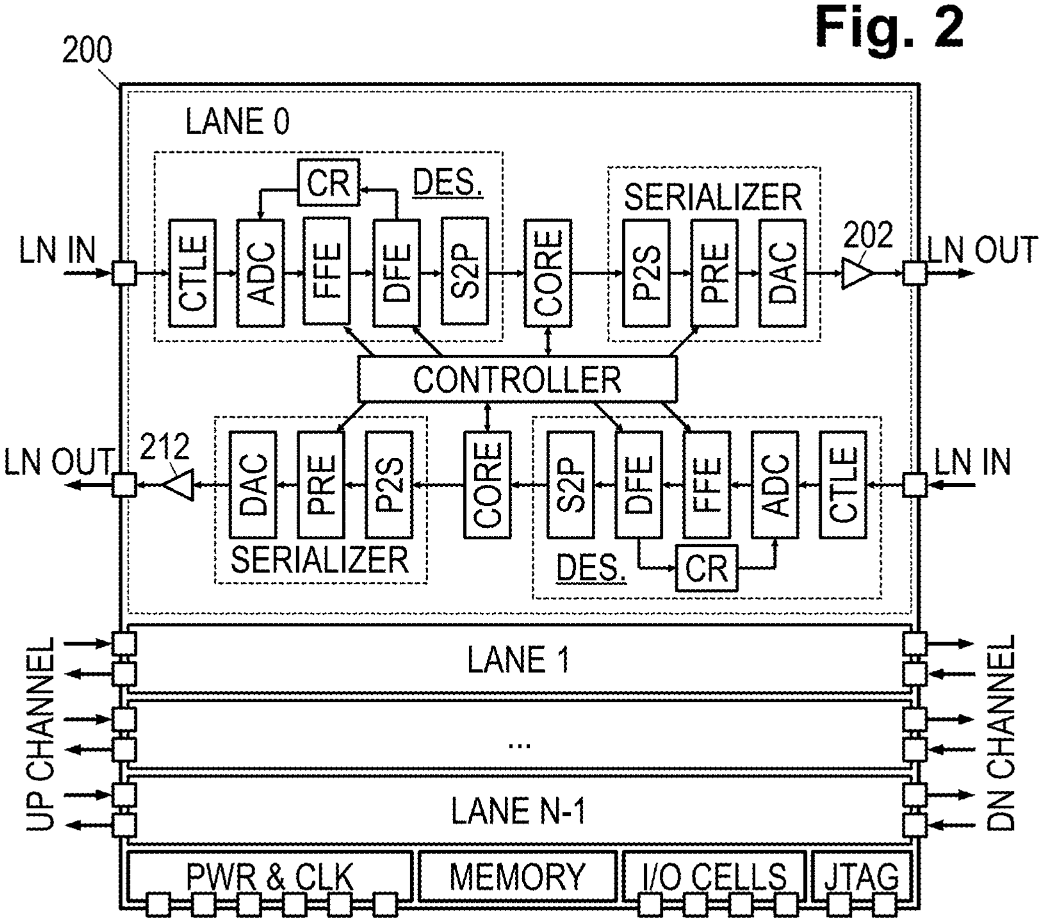
FIG. 2 is a schematic of an illustrative retimer having multiple lanes.

FIG. 2 shows an illustrative retimer in the form of a monolithic integrated circuit chip 200 having contacts for receiving off-chip signals and contacts for providing off-chip signals. Though the figure shows contacts for single-ended signals, in practice some of the input and output signals may be differential signals necessitating the use of a pair of contacts for each such signal. The contacts may be pads, pins, balls, bond wires, or any suitable conductive path from the integrated circuit substrate to the external surface traces.

Chip 200 includes multiple lanes Lane0 through Lane(N−1), each lane conveying an upstream PCIe signal from a downstream link to an upstream link and a downstream PCIe signal from an upstream link to a downstream link. Each lane includes a downstream retimer module having a deserializer (DES) that converts a downstream input PCIe signal into a downstream digital symbol stream, and a serializer that converts the downstream digital symbol stream into a retimed downstream PCIe signal. Each lane further includes an upstream retimer module having a deserializer that converts an upstream input PCIe signal into an upstream digital symbol stream, and a serializer that converts the upstream digital symbol stream into a retimed upstream PCIe signal. Core logic (CORE) buffers the digital symbol streams and optionally enables additional functions such as descrambling, deskew between lanes, ordered set (OS) decoding, link training state machine implementation, and scrambling.

A training controller, which in some implementations is an integrated part of the core logic, coordinates adaptation of the serializer and deserializer equalization parameters including, e.g., pre-equalization filter coefficients. Among other things, the training controller receives pre-equalizer adaptation information via a backchannel from remote ends of the upstream and downstream links ("backchannel info") and correspondingly generates pre-equalizer adaptation information locally for transmission to the remote ends of the upstream and downstream links ("local info"). A suitable communication protocol for conveying the local info and receiving the backchannel info via frame headers is set forth in the PCI Express Base Specification Revision 6.1 (Jul. 12, 2023), and in particular articles 4.2.4 and 4.2.5 thereof.

Each lane further includes output drivers 202, 212 to provide the downstream and upstream PCIe output signals to the downstream and upstream links, respectively. The output drivers 202, 212, buffer the serializer outputs, and in some cases may convert single-ended on chip signals to differential signals for the output contacts. In other implementations, the analog on-chip signals are maintained as differential signals throughout.

FIG. 2 also shows additional implementation detail for the illustrative serializers and deserializers. The deserializers implement the receiving function of the retimer modules, implementing decision feedback equalization ("DFE") or any other suitable equalization technique including those that employ a discrete-time finite impulse response ("FIR") filter with adjustable tap coefficients, e.g., linear equalization, partial response equalization.

Each illustrative deserializer includes a continuous time linear equalizer (CTLE) to attenuate out-of-band noise and to optionally provide some spectral shaping to amplify high-frequency components of the receive signal. An analog to digital converter (ADC) is provided to digitize the input signal, and a digital filter (also known as a feed-forward equalizer or "FFE") performs further equalization to further shape the overall channel response of the system and minimize the effects of leading intersymbol interference on the current symbol. As part of the shaping of the overall channel response, the FFE may also be designed to shorten the channel response of the filtered signal while minimizing any attendant noise enhancement. A decision feedback equalizer (DFE) subtracts a feedback signal to reduce the effects of trailing intersymbol interference before making symbol decisions with a symbol decision element. A clock recovery (CR) module may convert the equalization error (a difference between the symbol decision and the input to the symbol decision element) to a sampling clock for the analog to digital converter. A serial to parallel (S2P) module converts the sequence of symbol decisions to a parallelized stream of digital symbols for buffering or processing at a lower clock rate.

The symbol decision element employs a set of comparators to digitize the combined signal and produce a stream of output data. If the symbols are presumed to be PAM4 (−3, −1, +1, +3), the comparators may employ the decision thresholds −2, 0, and +2, respectively. The comparator outputs can be taken collectively as a thermometer-coded digital representation of the output symbol decision, e.g., with 000 representing −3, 100 representing −1, 110 representing +1, and 111 representing +3. Textbook-style embodiments employ an optional digitizer to convert the comparator outputs into a binary number representation, e.g., 00 to represent −3, 01 to represent −1, 10 to represent +1, and 11 to represent +3. Alternatively, a Gray-coded representation could be employed.

Each illustrative serializer includes a parallel to serial (P2S) module that converts the parallelized stream of digital symbols to a sequence of channel symbols. An optional pre-equalizer (PRE) can be used to shape the signal spectrum to at least partly compensate for channel attenuation of the output signal. A digital to analog converter (DAC) uses a transmit clock to produce the retimed PCIe signal.

Though not expressly shown here, it is expected that the filters may be parallelized, and the receiver augmented with one or more level finders to aid in determining decision thresholds and cumulative probability distributions for signals at upper and lower edges of the equalized signal decision eyes. Implementation and configuration detail for such features can be found in co-owned U.S. Pat. No. 11,018,656, issued May 25, 2021 and titled "Multi-function level finder for SerDes", which is hereby incorporated herein by reference.

Each lane further includes the previously mentioned training controller to coordinate adaptation of equalization parameters. The controller can apply any of the many suitable adaptation methods set forth in the open literature, including steepest descent, gradient descent, LMS, and exhaustive search, to optimize coefficient values of the FFE and optional DFE feedback filter. The PCIe specification provides two protocols for the controller to also optimize the pre-equalizer coefficient values at the remote ends of the communication links: "preset" and "coefficient". Under the preset protocol, the controller selects from a set of registers, each register having preset coefficient values for the full set of pre-equalizer coefficients. While the preset approach is relatively fast, selecting from a limited range of pre-equalizer configurations suited to the most common channel profiles, the resulting equalizer performance is typically suboptimal. The coefficient approach provides for independent adjustments for each of the pre-equalizer coefficients, providing optimized performance at the cost of a prolonged training time.

The pre-equalizer and FFE are each finite impulse response filters, producing an output sequence y that is a weighted sum of recent input values x:

$$y[n] = \sum_i c_i x[n-i]$$

where the index i typically ranges from 0 to N−1, where N is the number of coefficients. In some implementations, however, the index may take on negative values, ranging from, say, −2 to N−3. In such cases, i=0 corresponds to the cursor location, i>0 corresponds to locations preceding the cursor, or pre-cursor locations, and i<0 corresponds to locations following the cursor, i.e., post-cursor locations. The coefficients $c_1$, $c_{-1}$, respectively correspond to the first pre-cursor location and the first post-cursor location.

In one contemplated implementation, the FFE has three post-cursor coefficients, one cursor coefficient, and sixteen pre-cursor coefficients. Two of the pre-cursor coefficients may have adjustable locations relative to the cursor. The contemplated pre-equalizer has two post-cursor coefficients, one cursor coefficient, and one pre-cursor coefficient. For higher data rates, the number of coefficients may be expected to grow. It is here observed that most of the filter "energy" tends to be concentrated near the cursor, i.e., the filter coefficients more than two taps from the cursor location tend to be much smaller than the cursor coefficient. It may also be observed that the polarity of the first pre-cursor coefficient and of the first post-cursor coefficient is opposite that of the cursor coefficient which is usually taken to be positive. Due to this expectation, an "increase" to the first pre-cursor coefficient or to the first post-cursor coefficient is an increase to the coefficient magnitude, typically incrementing the coefficient in the negative direction.

Due to the communication overhead needed for adaptation of the pre-equalizer coefficients, pre-equalizer training can be significantly slower than training of the deserializer equalization parameters. Rather than relying on the preset training approach, however, it is herein contemplated that an independent coefficient training approach may be employed for pre-equalizer optimization. This coefficient training approach benefits from a targeted optimization approach based on the values of the more-quickly optimized receive-side equalization parameters.

It is herein observed that at a symbol rate of 32 GHz, the optimized FFE filter coefficients have a typical first pre-cursor coefficient magnitude between 30% and 70% of the cursor coefficient and a typical first post-cursor coefficient magnitude between 10% and 50% of the cursor coefficient. These FFE coefficient thresholds may vary based on the symbol rate, channel specifications, and parameter settings of any continuous time filters, but in any case can serve as a guide to the adaptation process for the pre-equalizer coefficients.

Figure 3:
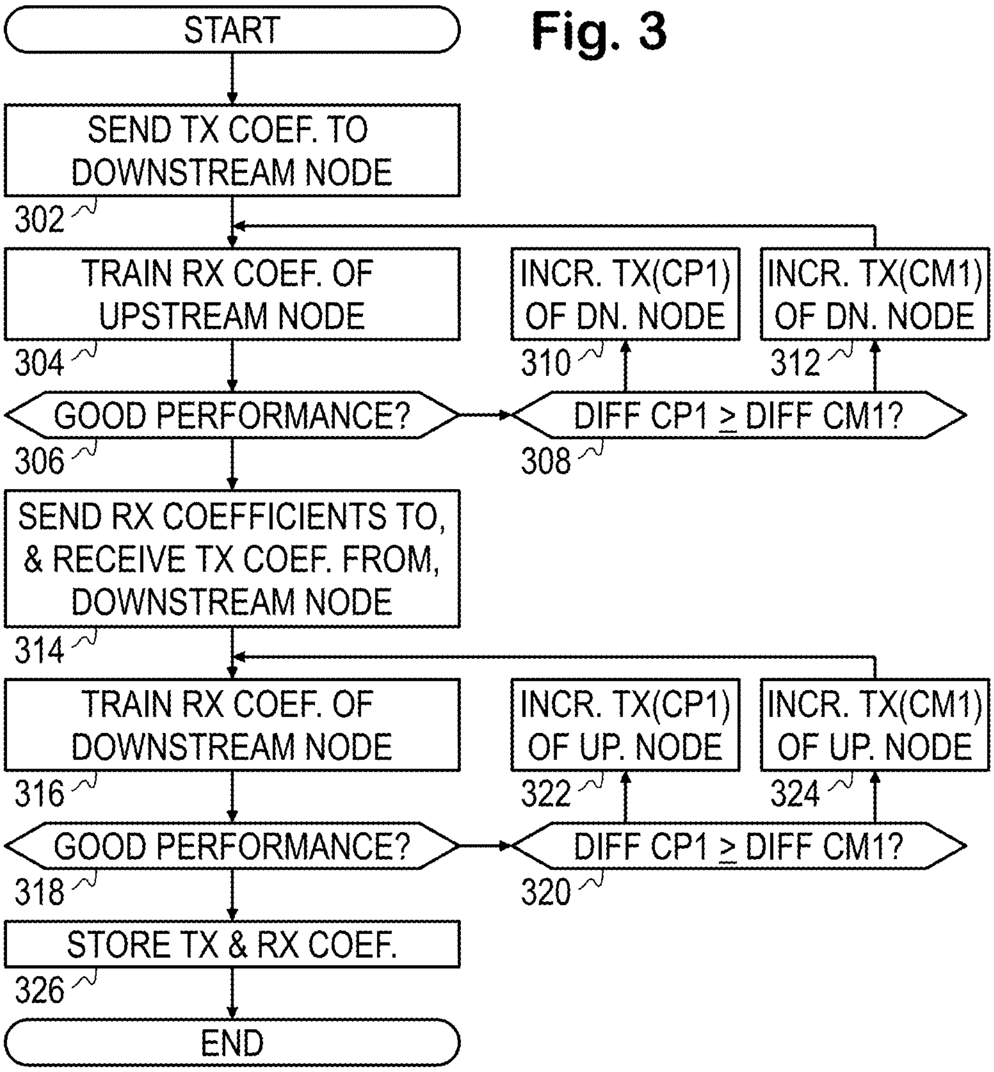
FIG. 3 is a flow diagram of an illustrative equalizer training method.

FIG. 3 is a flow diagram of an illustrative equalizer training method that occurs during the training process set forth in the PCIe Specification. For each PCIe link, both the upstream port and the downstream port exchange ordered sets of training data to establish operations. In block 302, the upstream port sends initial pre-equalizer coefficient values to the downstream port. These initial values may be default values, values from a selected preset register, stored values from previous operation, or any suitable set of starting values. In the absence of another starting point, the pre-cursor and post-cursor coefficients may be all set to zero.

In block 304, the downstream port configures the pre-equalizer and begins transmitting a training data sequence at the desired symbol rate. Based on the receive signal, the upstream port optimizes the receiver equalization parameters, including the FFE and DFE coefficients, for the given pre-equalizer coefficient settings.

In block 306, the upstream port evaluates whether the optimized receiver equalization parameters are providing acceptable performance, e.g., an error rate below $10^{-6}$. If not, then in block 308 the upstream port compares the optimized FFE pre-cursor and post-cursor coefficient to the predetermined thresholds. In one contemplated embodiment, the upper pre-cursor threshold is subtracted from the magnitude of the first pre-cursor coefficient value of the FFE, yielding a difference $DIFFc_{+1}$ (or DIFF CP1). The upper post-cursor threshold is subtracted from the magnitude of the first post-cursor coefficient value of the FFE, yielding a difference $DIFFc_{-1}$ (or DIFF CM1). The differences may be compared to determine which coefficient most exceeds the expected threshold value. If the first pre-cursor coefficient value most exceeds the threshold, then in block 310 the upstream port requests an increase in the magnitude of the first pre-cursor coefficient of the downstream port's pre-equalizer. Similarly, if the first post-cursor coefficient value most exceeds the threshold, then in block 312, the upstream port requests an increase in the magnitude of the first post-cursor coefficient of the downstream port's pre-equalizer.

It is expected that within a few iterations, the upstream port will discover adequate performance has been achieved in block 306. In block 314, the upstream port may communicate its optimized FFE coefficient values to the downstream port and obtain the optimized pre-equalizer coefficients from the downstream port. The upstream and downstream port may apply these settings to their pre-equalizer and FFE, respectively, before the upstream port begins sending training a training data sequence to the downstream port at the desired data rate. In block 316, the downstream port optimizes its receiver equalization parameters.

In block 318, the downstream performance evaluates whether the optimized receiver equalization parameters are providing acceptable performance, e.g., an error rate below $10^{-6}$. If not, then in block 320 the downstream port compares the optimized FFE pre-cursor and post-cursor coefficient to the predetermined thresholds. In one contemplated embodiment, the upper pre-cursor threshold is subtracted from the magnitude of the first pre-cursor coefficient value of the FFE, yielding a difference $DIFFc_{+1}$ (or DIFF CP1). The upper post-cursor threshold is subtracted from the magnitude of the first post-cursor coefficient value of the FFE, yielding a difference $DIFFc_{-1}$ (or DIFF CM1). The differences may be compared to determine which coefficient most exceeds the expected threshold value. If the first pre-cursor coefficient value most exceeds the threshold, then in block 322 the upstream port requests an increase in the magnitude of the first pre-cursor coefficient of the upstream port's pre-equalizer. Similarly, if the first post-cursor coefficient value most exceeds the threshold, then in block 324, the upstream port requests an increase in the magnitude of the first post-cursor coefficient of the upstream port's pre-equalizer.

It is expected that within a few iterations, the downstream port will discover adequate performance has been achieved in block 318. In block 326, the upstream port and/or the downstream port may store their optimized coefficient values for reuse in subsequent boot-up procedures for the link.

Numerous alternative forms, equivalents, and modifications will become apparent to those skilled in the art once the above disclosure is fully appreciated. For example, a PCIe link has been used in the foregoing description, but the principles disclosed herein are also applicable to other digital communication protocols providing for the use of pre-equalizers. It is intended that the claims be interpreted to embrace all such alternative forms, equivalents, and modifications that are encompassed in the scope of the appended claims.

What is claimed is:

1. An equalizer that comprises:

a discrete-time, finite impulse response ("FIR") filter configured to convert a receive signal to a filtered signal;

a set of one or more comparators to determine channel symbols represented by the filtered signal; and a controller that is:

configured to adjust coefficients for the FIR filter based on a performance of the equalizer, the coefficients including a first post-cursor FIR coefficient and a first pre-cursor FIR coefficient; and if the performance is not acceptable:

configured to determine a post-cursor difference between the first post-cursor FIR coefficient and a post-cursor threshold;

configured to determine a pre-cursor difference between the first pre-cursor FIR coefficient and a pre-cursor threshold;

configured to compare the post-cursor difference to the pre-cursor difference to determine a greater one of the post-cursor difference and the pre-cursor difference; and configured to change a first post-cursor pre-equalizer coefficient if the post-cursor difference is the greater one or a first pre-cursor pre-equalizer coefficient if the pre-cursor difference is the greater one.

2. The equalizer of claim 1, wherein the performance is based on the channel symbols and at least one of the filtered signal or an input signal to the set of one or more comparators.

3. The equalizer of claim 1, wherein the controller changes the first post-cursor pre-equalizer coefficient and the first pre-cursor pre-equalizer coefficient in part by sending a change request via an embedded backchannel to a far end transmitter.

4. The equalizer of claim 3, wherein the change request is a request to increment a magnitude of the first post-cursor pre-equalizer coefficient.

5. The equalizer of claim 1, wherein the controller is further configured to iteratively adjust the coefficients for the FIR filter and change a pre-equalizer coefficient corresponding to a greater of the post-cursor difference and the pre-cursor difference until the performance reaches a target.

6. The equalizer of claim 5, wherein the controller is further configured to store the coefficients for the FIR filter, the first post-cursor pre-equalizer coefficient, and the first pre-cursor pre-equalizer coefficient for use as initial values after power on or reset.

7. An equalization method that comprises:

converting a receive signal to a filtered signal using a discrete-time, finite impulse response ("FIR") filter;

using a set of one or more comparators to determine channel symbols represented by the filtered signal;

adjusting coefficients for the FIR filter based on a performance of the equalizer, the coefficients including a first post-cursor FIR coefficient and a first pre-cursor FIR coefficient; and until the performance is acceptable, iteratively:

determining a post-cursor difference between the first post-cursor FIR coefficient and a post-cursor threshold;

determining a pre-cursor difference between the first pre-cursor FIR coefficient and a pre-cursor threshold;

determining a greater one of the post-cursor difference and the pre-cursor difference;

changing a first post-cursor pre-equalizer coefficient if the post-cursor difference is the greater one or a first pre-cursor pre-equalizer coefficient if the pre-cursor difference is the greater one; and repeating said adjusting the coefficients of the FIR filter.

8. The equalization method of claim 7, wherein the performance is based on the channel symbols and at least one of the filtered signal or an input signal to the set of one or more comparators.

9. The equalization method of claim 7, wherein said changing the first post-cursor pre-equalizer coefficient and said changing the first pre-cursor pre-equalizer coefficient each includes sending a change request via an embedded backchannel to a far end transmitter.

10. The equalization method of claim 9, wherein the change request is a request to increment a magnitude of the first post-cursor pre-equalizer coefficient.

11. The equalization method of claim 7, wherein the method further includes storing the coefficients for the FIR filter, the first post-cursor pre-equalizer coefficient, and the first pre-cursor pre-equalizer coefficient for use as initial values after power on or reset.

12. A system that comprises:

a remote port having:

a pre-equalizer configured to convert a digital transmit signal to an equalized transmit signal; and a digital to analog converter configured to convert the equalized transmit signal to a channel signal; and a local port having:

an analog to digital converter configured to provide a digital receive signal representing the channel signal;

a discrete-time, finite impulse response ("FIR") filter configured to convert the digital receive signal to a filtered signal;

a set of one or more comparators to determine channel symbols represented by the filtered signal; and a local controller configured to adjust at least a first post-cursor FIR coefficient and a first pre-cursor FIR coefficient based on equalizer performance and, conditioned on whether the performance is acceptable, the local controller further configured to:

determine a post-cursor difference between the first post-cursor FIR coefficient and a post-cursor threshold;

determine a pre-cursor difference between the first pre-cursor FIR coefficient and a pre-cursor threshold;

compare the post-cursor difference to the pre-cursor difference to determine a greater one of the post-cursor difference and the pre-cursor difference; and change a first post-cursor pre-equalizer coefficient if the post-cursor difference is the greater one or a first pre-cursor pre-equalizer coefficient if the pre-cursor difference is the greater one.

13. The system of claim 12, wherein the local controller changes the first post-cursor pre-equalizer coefficient or changes the first pre-cursor pre-equalizer coefficient in part by sending a change request via an embedded backchannel to a controller of the remote port.

14. The system of claim 13, wherein the change request is a request to increment a magnitude of the first post-cursor pre-equalizer coefficient or the first pre-cursor pre-equalizer coefficient.

15. The system of claim 12, wherein the local controller is further configured to iteratively adjust the at least the post-cursor FIR coefficient and the first pre-cursor FIR coefficient and to change the post-cursor pre-equalizer coefficient and the first pre-cursor pre-equalizer coefficient until the performance reaches a target.

* * * * *